United States Patent Office 2,890,230
Patented June 9, 1959

2,890,230
PROCESS FOR PURIFICATION OF
PELARGONIC ACID

William S. Port, Norristown, and George R. Riser, Philadelphia, Pa., assignors to the United States of America as represented by the Secretary of Agriculture No Drawing. Application November 20, 1956
Serial No. 623,508

4 Claims. (Cl. 260—410.9)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a process of treating commercial pelargonic acid to obtain a substantially pure pelargonic acid suitable for use in the preparation of polymerizable derivatives, such as vinyl pelargonate, which are capable of being polymerized without gelation or insolubilization. Such polymerizable derivatives of pelargonic acid are useful in the preparation of adhesives, lubricant additives, and as polymer emulsions for waterbase paints.

Commercial pelargonic acid is prepared by the oxidative cleavage of oleic acid and contains at least about 90% of pelargonic acid, and about 10% of other monobasic acids including minor amounts of dibasic acids. When this commercial pelargonic acid is used for the preparation of polymerizable derivatives, such as allyl and vinyl pelargonates, the resulting monomer will gel during the polymerization process, presumably due to the presence of the polymerizable derivatives of the dibasic acids. For most purposes, such insoluble and infusible polymers are useless.

We have now discovered a process for treating commercial pelargonic acid to obtain a substantially pure pelargonic acid from which polymerizable derivatives can be prepared which do not gel during polymerization.

According to the invention, commercial pelargonic acid is reacted with a sufficient amount of a glycol having from 2 to 4 carbon atoms to convert the acids contained therein to the corresponding glycol diesters, and then distilling the reaction mixture containing the said diesters to separate the dipelargonate ester therefrom.

If desired, the dipelargonate ester can thereafter be converted to free pelargonic acid by any conventional means, such as hydrolysis, or the ester can be converted by ester-interchange (alcoholysis) to a polymerizable derivative, such as allyl pelargonate.

Glycols which can be used in this process are ethylene glycol, propylene glycol, 1,3-propanediol, and the isomeric butanediol, but for economic reasons ethylene glycol is preferred.

Approximately equivalent amounts of the glycol and the pelargonic acid are preferred, but a lesser amount of the glycol may be used provided a sufficient amount is added to esterify all of the dibasic acid present. If less than an equivalent amount of a glycol is used, a mixture of purified pelargonic acid and a purified glycol dipelargonate will be obtained. More than an equivalent amount of a glycol may be used (in which case a mixture of purified mono-pelargonate and dipelargonate esters will be obtained), but this is not to be preferred for economic reasons. The reaction and distillation temperatures are not critical. The former temperature must be sufficiently high to ensure a reasonable rate of esterification and the latter temperature must be sufficiently low to prevent decomposition of the ester formed.

The reaction may be catalyzed by a conventional esterification catalyst, preferably a non-oxidizing acidic catalyst, such as β-naphthalenesulfonic acid, or none at all may be used.

A conventional "entraining agent," such as toluene, may also be used to remove the water formed in the esterification and thus drive the reaction to a high yield. Its presence, however, is not critical for operativeness.

The following example is illustrative of the invention.

A solution of 960 grams (6.06 moles) of commercial pelargonic acid, 186 grams of ethylene glycol (3.0 moles), 400 cc. toluene and 13.6 grams β-naphthalene sulfonic acid were refluxed in an apparatus having a water trap. As the water formed, it distilled with the toluene and was separated in the trap. When water ceased to separate, the reaction solution was cooled, was washed with water and was dried over anhydrous calcium sulfate. The calcium sulfate was filtered off, and the filtrate was distilled. 894 grams of ethylene dipelargonate were collected which boiled at 222–224 C. at 8.5 mm., $n_D^{35}$ 1.4375–1.4379.

The ethylene dipelargonate, produced as described above, can be converted to the free pelargonic acid by conventional means. The use of hydrolysis is illustrated as follows:

A solution of the 894 grams of the ethylene dipelargonate in a liter of 95% ethanol was heated at 60° C. and while the mixture was being stirred, 840 grams of sodium hydroxide in 1600 cc. of water were slowly added. Stirring and heating were continued until saponification was complete. The solution was cooled, and 500 cc. of 33% sulfuric acid were added slowly with stirring. The liberated pelargonic acid was separated from the aqueous layer and was distilled. A yield of 753 grams of pelargonic acid boiling at 132–133° C. at 6.3 mm., $n_D^{40}$ 1.4245–1.4246, was obtained. Its acid number was 355 (theory 356).

Also, the ethylene dipelargonate produced as described above, can be converted to a polymerizable derivative capable of being polymerized without gelation or insolubilization. This is illustrated by the preparation of vinyl pelargonate and the polymerization thereof as follows:

Vinyl pelargonate was prepared by the method of D. Swern and E. F. Jordan, Jr., J. Am. Chem. Soc., 70, 2334 (1948) using the purified pelargonic acid obtained from the above-described example. This process was carried out according to the disclosure of Toussaint and MacDowell, Jr., U.S. Patent No. 2,299,862 (cited in said article) as follows:

Mercuric acetate, 14.2 grams, was dissolved in 753 grams of purified pelargonic acid and 2425 grams of distilled vinyl acetate. One and one-half cc. of 100% sulfuric acid were then added and the mixture was refluxed for 3 hours. It was then cooled and treated with 7.67 grams sodium acetate. Unused vinyl acetate was removed from the reaction mixture by distillation at atmospheric pressure; acetic acid was removed by distillation at 100 mm. The residue was distilled, and the fraction boiling at 129° C. at 46 mm. (weighing 660 g.) was treated with 6 grams of sodium bircarbonate and redistilled. A fraction, 409 grams, boiling at 136° at 50 mm. pressure, $n_D^{30}$ 1.4286, iodine number 135.8 (theory 138) was collected as pure vinyl pelargonate.

A solution of 10 grams of this vinyl pelargonate and 0.025 gram benzoyl peroxide was heated at 70° C. for 3 hours. The refractive index of the mixture (measured at 30° C.) rose from 1.4285 to 1.4535 and the solution became very viscous. The polymer thus formed was entirely soluble in benzene.

As a comparison, the following two polymerization experiments were carried out using commercial pelargonic acid which had not been purified according to the instant process:

(1) Vinyl pelargonate was prepared as above using commercial pelargonic acid purified only by extraction with hot water and distillation. Five grams of this impure vinyl pelargonate containing 0.5 mole percent benzoyl peroxide was heated at 80° C. for 3 hours. The resulting polymer was an insoluble and infusible gel.

(2) Forty-six grams of vinyl pelargonate, prepared from commercial pelargonic acid purified by distillation only, was polymerized at 75° C. in a 1% aqueous solution of polyvinyl alcohol using 0.15 gram benzoyl peroxide as an initiator. The polymer which formed was a gel which was insoluble in benzene.

What is claimed is:

1. A process of treating commercial pelargonic acid containing at least about 90% of pelargonic acid and about 10% of other monobasic acids including minor amounts of dibasic acids comprising reacting said commercial pelargonic acid with a sufficient amount of a glycol having from 2 to 4 carbon atoms to convert the said acids to the corresponding glycol diesters, and distilling the reaction mixture containing the said diesters to separate the dipelargonate ester therefrom.

2. The process of claim 1 wherein the glycol is ethylene glycol.

3. A process for producing a polymerizable derivative of pelargonic acid capable of being polymerized without gelation or insolubilization and selected from the group consisting of vinyl and allyl pelargonates comprising reacting commercial pelargonic acid containing at least about 90% of pelargonic acid and about 10% of other monobasic acids including minor amounts of dibasic acids with a sufficient amount of a glycol having from 2 to 4 carbon atoms to convert the said acids to the corresponding glycol diesters, distilling the reaction mixture containing the said diesters to separate the dipelargonate ester therefrom, and converting the dipelargonate ester to a polymerizable pelargonate ester selected from the group consisting of vinyl and allyl pelargonates.

4. A process for producing a vinyl pelargonate capable of being polymerized without gelation or insolubilization comprising reacting commercial pelargonic acid containing at least about 90% of pelargonic acid and about 10% of other monobasic acids including minor amounts of dibasic acids with a sufficient amount of a glycol having from 2 to 4 carbon atoms to convert the said acids to the corresponding glycol diesters, distilling the reaction mixture containing the said diesters to separate the dipelargonic ester therefrom, and converting the dipelargonate ester to vinyl pelargonate.

References Cited in the file of this patent

UNITED STATES PATENTS

| | | |
|---|---|---|
| 1,848,724 | Jaeger | Mar. 8, 1932 |
| 2,560,156 | Cavanaugh et al. | July 10, 1951 |
| 2,588,435 | Van Loon et al. | Mar. 11, 1952 |
| 2,783,270 | Polly et al. | Feb. 26, 1957 |
| 2,802,024 | Fasce et al. | Aug. 6, 1957 |